United States Patent [19]
Sawatzki et al.

[11] Patent Number: 5,018,399
[45] Date of Patent: May 28, 1991

[54] MECHANICAL SERVOMOTOR

[75] Inventors: Harry L. Sawatzki, Vaduz, Liechtenstein; Harald Feistenauer, Lindenberg, Fed. Rep. of Germany

[73] Assignee: Firma Saurer-Allma GmbH, Kempten, Fed. Rep. of Germany

[21] Appl. No.: 395,083

[22] Filed: Aug. 17, 1989

[30] Foreign Application Priority Data

Aug. 18, 1988 [CH] Switzerland ............. 03085/88

[51] Int. Cl.$^5$ .............................................. F16H 21/44
[52] U.S. Cl. .................................................... 74/110
[58] Field of Search ........................................ 74/110

[56] References Cited

U.S. PATENT DOCUMENTS

| | | | |
|---|---|---|---|
| 2,658,393 | 11/1953 | Woods | 74/110 |
| 3,113,466 | 12/1963 | Osborne | 74/110 |
| 4,270,398 | 6/1981 | Arnold | 74/110 |
| 4,519,482 | 5/1985 | Ott et al. | 74/110 X |
| 4,549,442 | 10/1985 | Hans et al. | 74/110 |
| 4,549,719 | 10/1985 | Baumann | 74/110 X |
| 4,838,112 | 6/1989 | Barner | 74/110 X |
| 4,856,359 | 8/1989 | Krause | 74/110 |
| 4,887,697 | 12/1989 | Micke | 74/110 X |

FOREIGN PATENT DOCUMENTS

| | | |
|---|---|---|
| 2308175 | 9/1975 | Fed. Rep. of Germany . |
| 2844265 | 4/1980 | Fed. Rep. of Germany . |
| 614905 | 12/1948 | United Kingdom . |

Primary Examiner—Dwight Diehl
Attorney, Agent, or Firm—Fleit, Jacobson, Cohn, Price, Holman & Stern

[57] ABSTRACT

A wedge-type mechanical servomotor has a primary member (1) with wedge faces (10) on which roll bodies (7) may move. The roll bodies (7) also engage faces (8) on abutment (9). Further roll bodies (17) engage cooperating wedge faces (16) on abutment (9) and (18) on secondary output member (19), and other roll bodies (5) engage cooperating faces (13) on abutment (9) and (14) on bushing (26), so that the device achieves essentially pure rolling movement of the roll bodies (5,7,17) which move between all faces on abutment (9) and faces (10, 14, 18) opposite to these faces (8, 13, 16) and supporting the roll bodies (5, 7, 17).

9 Claims, 3 Drawing Sheets

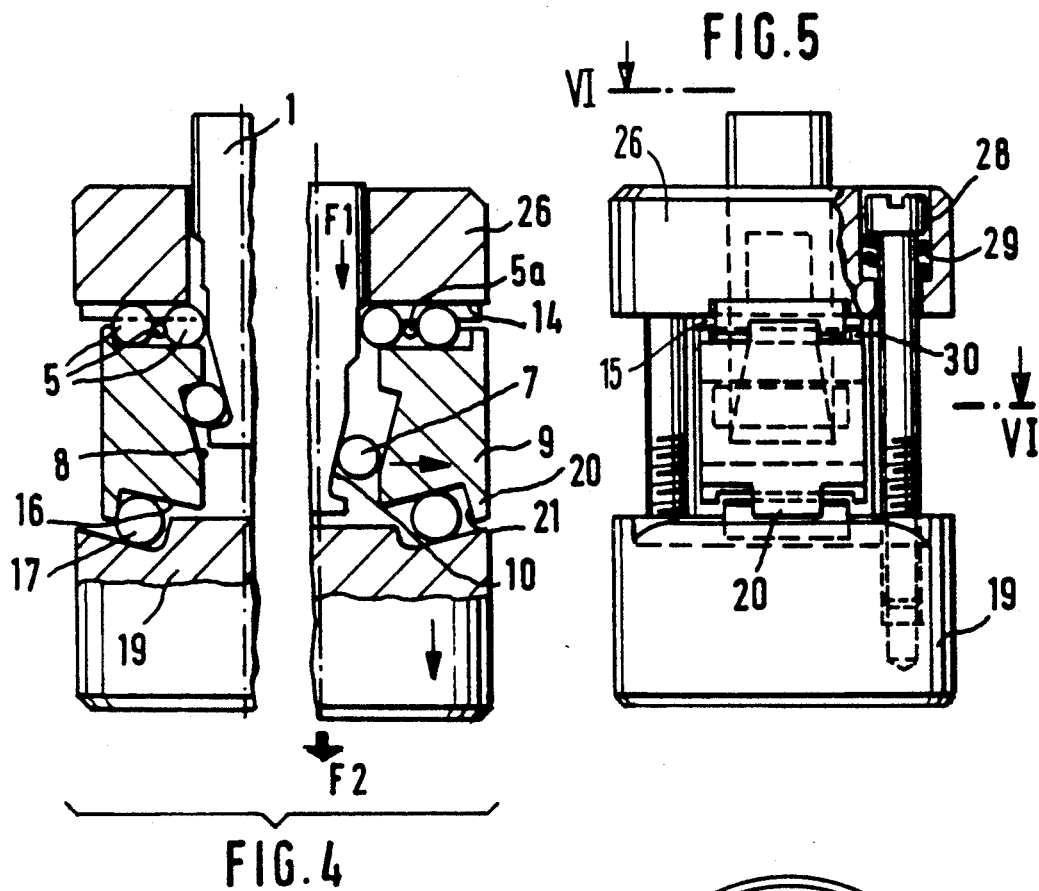
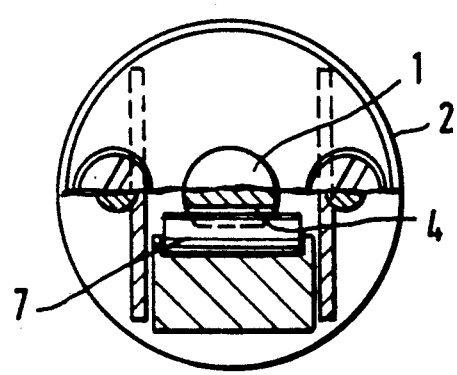

MECHANICAL SERVOMOTOR

BACKGROUND OF THE INVENTION

The invention relates to a mechanical servomotor.

Servomotors of this type are often used in manually-operated spindles in vices and other devices requiring a high clamping pressure, and are disclosed in British Patent GB-A-614 904 and German Patent document DE-G-28 44 265. A sliding primary member having wedge faces is mounted inside a housing so that the wedge faces are next to roller bodies, there being a rolling action between their opposed peripheral side and fixed abutting faces. The present invention is concerned with the problem that despite this rolling action, servomotors of this type are actually sluggish in action and subject to much wear.

The investigations of the applicant have revealed that the rolling condition can be maintained only to a certain extent. At many points and in various movement phases there tends to be a sliding friction instead of the desired rolling friction. This phenomenon is inherent in the system of the known designs and cannot be corrected merely by altering relative sizes.

Attempts have been made to ensure a rolling friction, as evidenced in German Patent document DE-C-23 08 175, which discloses a toggle lever servomotor comprising two toggle-like roll bodies. This design requires that both roll bodies be secured at both ends to avoid a mutual displacement, as otherwise the faces of the one roll body would not roll exactly on the faces of the other roll body associated with it so that its resulting moving path would not be correct. However, the displacement of the support point toward both sides of each toggle-like roll body means that only small power amplifications can be expected. To avoid great frictional forces over long paths the stroke produced by the roll bodies will usually be quite small.

BRIEF SUMMARY OF THE INVENTION

The object of the invention is to reduce the frictional forces in a wedge-type servomotor without thereby losing power amplification.

According to the present invention there is provided a mechanical servomotor, comprising a primary member having wedge faces which can be moved between a first pair of two mirror-image roll bodies arranged in a plane of symmetry and offset on abutting faces of an abutment along the plane of symmetry, its wedge faces resting on the circumferences of the roll bodies and comprising at least one other pair of roll bodies next to the abutment and a secondary member which transmits the amplified power, characterized in that, to achieve a purely rolling movement of the roll bodies between the faces of the abutment and the faces opposite these faces and supporting the roll bodies the abutment is movably mounted, whereby at least the opposing faces formed on the secondary member are designed as wedge faces.

A correct rolling action of the roll bodies on both the adjacent faces of each roll body is ensured because the abutment can now move. Furthermore, this double movement means that it is possible to increase the amplification of force if the abutment is also a wedge.

The movement of the abutment can be a rotational movement about an axis lying in the finite, but it is preferred that the abutment swivels about an axis lying in the infinite.

In the known designs the additional pair of roll bodies formed a kind of wedge with the first-mentioned pair by way of an angular offset at one and the same rolling surface, or through the different sizes of the pairs of roll bodies, yet even this arrangement can cause frictional effects, because the different sizes of the roll bodies means that the latter cannot roll with a uniform circumferential speed at all points. There is however a way out of this difficulty if the other pair of roll bodies rests or rolls on opposing faces of the moveable abutment running perpendicular to the plane of symmetry for the purpose of support and transmission of power. This will also improve the ability to move of the abutment, which can then move like a drawer running on rollers. This will effectively improve the power amplification if at least one of the faces is inclined to the plane of symmetry at an angle differing from 90° and/or curved in the direction of the roll bodies. A preferred design comprises a movable abutment having guide faces on two opposite sides for guiding its shifting movement, to which is associated at least one of the other roll bodies, for example in pairs, so that preferably on one side the guide faces are formed by the wedge faces of the abutment facing the secondary member and that preferably at least one of the guide faces are associated with pairs of roll bodies on both sides of the plane of symmetry, which are spaced from each other by means of an intermediate roll body, in particular one of reduced diameter, for example by means of a needle body. It is thus possible to make the guide face facing away from the secondary member to be wedge-like running perpendicular to the plane of symmetry, in which case the abutment will effect a lateral shift.

If the expression "plane of symmetry" is used in this description, this does not necessarily mean a two-sided symmetric arrangement; indeed there could be in fact a radially-symmetric arrangement, in which the plane of symmetry includes an angle in a central axis, for example where there are three roll bodies whose sections are offset by 120° (they do not have to be rollers, they can be balls, needles or the like).

BRIEF DESCRIPTION OF THE DRAWINGS

Further details of the invention are given in the following description of the practical non-limiting examples illustrated schematically in the accompanying drawing, wherein:

FIG. 4 is a view similar to FIG. 1 of another embodiment of the invention;

FIG. 5 is a side view (partly in section) of FIG. 4;

FIG. 6 is a half cross-sectional view taken along line VI—VI of FIG. 5; and

DETAILED DESCRIPTION

Figure 1:
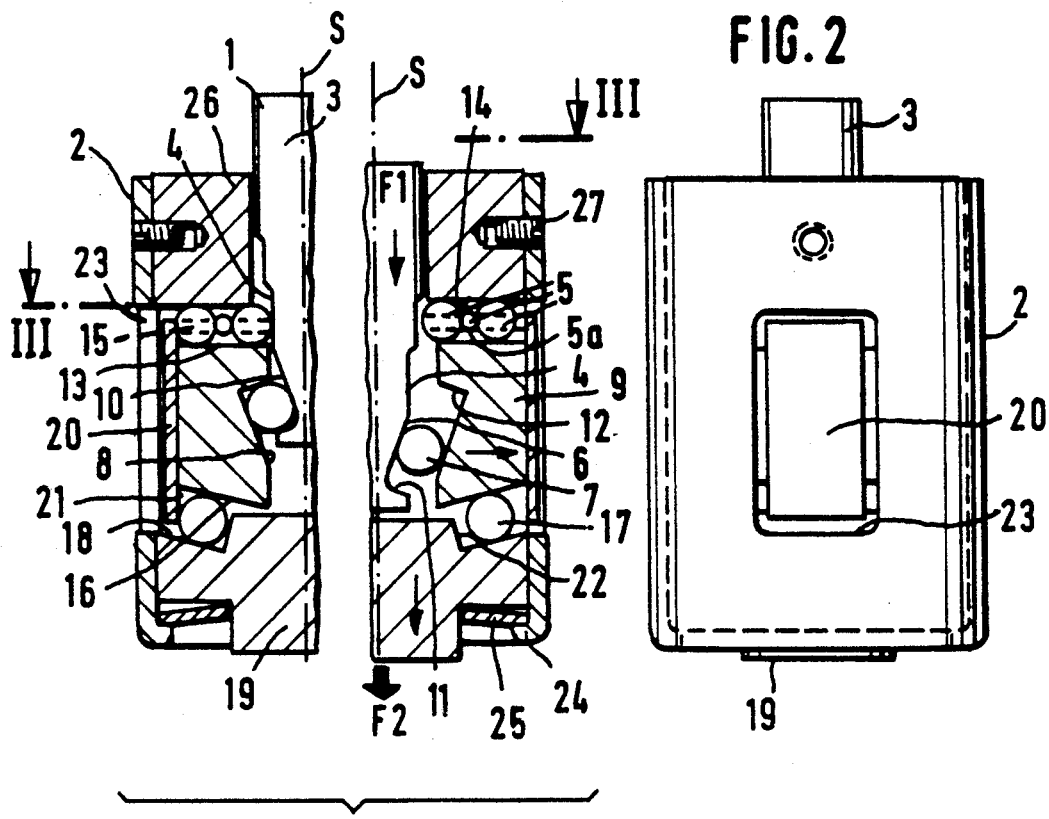
FIG. 1 is a longitudinal cross-sectional view of a first specific embodiment of the invention.

The mechanical servomotor shown in FIG. 1 includes a bolt-shaped primary member 1 which can be shifted along the longitudinal axis of a housing 2 in the direction of the arrow F1. This arrangement is symmetric on both sides, (see FIG. 3) a plane of symmetry running through the longitudinal axis of the housing 2, a mirror-image arrangement of the component parts being provided on either side thereof.

Figure 3:
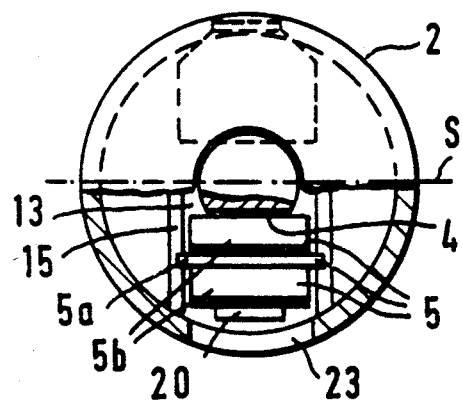
FIG. 3 is a half cross-sectional view taken along line III—III in FIG. 1.

In the left-hand half of FIG. 1 the primary member 1 is shown in its retracted, normal position, while in the right-hand half of FIG. 1 in its advanced, active position. The primary member 1 has a shaft section 3 mounted inside the housing 2, having one or more grooves 4 on both sides of the plane of symmetry S inside the housing 2, which facilitate the movement of guide roll bodies 5. As FIG. 3 shows, these roll bodies 5 take the form of rollers, with an intermediate needle 5a. The roll bodies may be given any appropriate shape, for example they may be balls, needles etc,. However, elongated roll bodies, i.e. rollers or needles, are preferred, for reasons to be explained below.

The section with the groove 4 is adjoined by a wedge section 6, on which there rests a roll body 7 (for example a ball, but preferably a roller) of a first pair of roll bodies on both sides of the plane of symmetry S. On the opposite side of the circumference of each roll body 7 there is an abutting surface 8 of an abutment 9. The wedge faces 10 of the wedge section 6 of the primary member 1 are suitably arranged parallel to the abutting faces 8, so that the roll bodies 7 are inserted in between and are always in contact with the two faces with each of their rolling movements. Because the two faces 8 and 10 are parallel, the same length of both faces is assured, so that when the roll bodies 7 are in motion the same distance must be travelled on both sides of their centers, thus assuring a rolling action and preventing a sliding one. This method also effectively locks the position of the roll bodies 7. It will thus be evident that the rolling motion of the roll bodies 7 will bring about a lengthwise motion of the wedge faces 10 in a path that is only half as long.

In order to prevent the roll bodies 7 jumping out of the gap formed between the faces 8 and 10, and also to assure a definite initial behaviour of the roll bodies 7 as to move from their normal position (FIG. 1 top) to the active condition (FIG. 1 bottom), the primary member 1 is suitably designed with a retaining face 11 in the form of a retainer ring or strip, which is directly next the wedge section 6 and preferably embraces the outer circumference of the roll bodies 7. It can be seen that the roll bodies 7 are thus retained practically on all sides in their normal position, that is, by their rolling faces 8 and 10, and also by the retaining face 11 of the primary member 1 and preferably also by a retaining face 12 on the abutment 9. This clearly defines the starting or the normal position, so that an accidental displacement (say by jolts, etc.) of the roll bodies relative to the faces 8 and 10 is not possible, which would have meant a sliding friction instead of the desired rolling friction.

The wedge faces 10 of the primary member 1 press radially outward the pair of roll bodies 7 (referred to the plane of symmetry S), but the roll bodies 7 are enclosed between the faces 8 and 10, so it must be possible for the abutment to move outwards. This movement requires some form of guide. In the simplest case this guide could comprise a swivel guide, in which the abutment 9 would be pivoted on an axis located near the edge of the housing 2, for example, level with the transition of the faces 8 and 12 or even further toward the guide roll body 5. A simple guide could be achieved in allowing at least some sliding friction, whereby a swivelling of the abutment 9 about an axis lying in the infinite, i.e. a sliding movement, is preferred. For this shifting movement the abutment 9 passes on one side over the already mentioned guide roll bodies 5, 5a, which roll on guide faces 13 (of the abutment 9) and 14 (of the housing 2).

In the present case a number of guide roll bodies 5 are provided and so provision must be made such that adjacent rollers 5b (see FIG. 3) have the same direction of rotation. This would mean however that they would rub against each other when coming into contact. To prevent this happening spacers are provided which prevent such a frictional contact. To improve the rolling action using frictional drive such a spacer can take the form of an intermediate roll body 5a, which thus acts as a kind of intermediate gear and helps to transmit the rotational movement of one roll body 5b to the other. This intermediate roll body 5a now has a direction of rotation which is exactly opposite to that of the two guide roll bodies 5b and would, had it not a diameter that is smaller than these, rub on the guide faces 13 and 14. To stop even this happening the intermediate roll body 5a is suitably designed as a needle. In FIG. 3, this intermediate roll body 5a is guided and retained in position by being longer than the guide roll body 5b and thus extends into the central guide slot 15 in the housing 2. In principle, such an arrangement could be provided on all those places on the servomotor where roll bodies abut on rolling faces, though such an arrangement would only be useful where the danger of canting during movement has to be prevented, so that this arrangement is preferred only for the guide roll body 5.

On the side which is opposite its guide face 13 the abutment 9 is guided by means of an opposing face 16 on which a roll body 17 of another pair of roll bodies rolls. Even this pair of roll bodies 17 is enclosed by mutually parallel rolling faces 16 and 18, of which the rolling face 18 is arranged on a secondary member 19. The opposing faces 13, 14 and 16, 18 thus run transversely to the plane of symmetry S, whereby the opposing faces 16, 18 are designed as wedge faces and their wedge angle along with that of the wedge faces 10 determines the power amplification. It is thus very easy to determine the power amplification by altering two wedge angles. The guide faces 13, 14 as shown run exactly perpendicular to the plane of symmetry S, but this is not absolutely necessary. If desired, these faces 13, 14 could also be made to incline to the plane of symmetry S by an angle differing from 90°, this helping to determine the wedge and power amplifying factor. This would not give to the abutment 9 a strictly perpendicular movement relative to the plane of symmetry S, and it may well be that this will allow fine dust and dirt to get into the housing 2, so the shown perpendicular guide is preferred but this does provide a third manner of determining the power amplification.

To obviate the danger of fouling, the abutment 9 has a cover plate 20, on its outside which in the normal position retracts into the housing interior in the manner indicated in FIGS. 1 and 3. This cover plate 20 forms with its section projecting past the opposing face 16 a retaining face 21 for the relevant roll body 17, which on the other side, in the normal position, is held by a retaining face 22 of the secondary member 19. This produces the same advantages as were described above concerning the retaining faces 11 and 12.

The lengths of travel and the sizes may be selected so that a cover plate 20 is not needed, which in the active condition shown in the bottom of FIG. 1 enters a housing opening 23. If need be the housing 2 may be further dimensioned so that when in its active condition the abutment 9 is next an outside wall of the housing thus obviating a housing opening 23.

As already mentioned, the power amplification is produced by the wedge effect of the faces 8, 10 and 16, 18, and if need be the faces 13, 14, so that a long-path movement with a small force, indicated by the long thin arrow F1, on the sides of the primary member 1, is changed into a short but powerful, movement as indicated by the short thick arrow F2, on the sides of the secondary member 19. No automatic restoration into the normal position is needed but if required, this could be provided by a return mechanism. Such a return device may be of any known design, for example the type having a gas-actuated piston, a rubber-elastic member or solenoid. The preferred return is by using a compression spring. For example, the outside wall of the housing 2 may be flanged in the manner shown in FIG. 1, and thus serve as an abutment for a cup spring 25 located between the flange 24 and the secondary member. However, the cup spring 25 is rather difficult to remove should it break, and as an alternative a similar kind of retainer can be installed into a cylindrical housing 2, in place of the flange 24, such as is provided on the primary member 1 in the form of a bush retainer 26, kept in position by bolts 27, or the like. This bush 26 would then serve to guide the primary member 1 and (with its front faces 14) to guide the guide roll body 5.

The specific embodiment shown in FIGS. 4 to 6 is similar to the foregoing one, so that no further description is called for, the reference numbers relating to parts of indentical function as in the earlier description.

Figure 2:
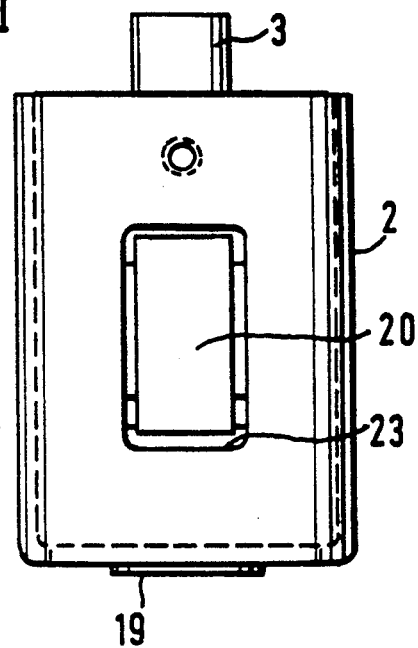

It can be seen that the diameter of the secondary member 19 and of the bush 26 project past the outer position of the cover plate 20, in this case integral with the abutment 9, in its active condition (FIG. 4, right). Therefore, an outer wall surrounding the parts 19 and 26, but in this case not needed and therefore not shown, could be designed without an opening 23 (FIG. 2). This would then be an all-enclosed design, which could be used at all those places where there is an increased danger of fouling. For this purpose seals could be fitted on the moving parts, that is, on the primary and secondary members 1 or 19. The cover plate 20 would then not be to cover the housing opening, but would serve as a stop on the outside housing wall and, with its extension in the region of the wedge face 16, as a retaining face 21.

The main difference of this embodiment resides in the design of the return mechanism, which to save space is installed inside a hollow secondary member 19. The bushing 26 therefore has cylindrical holes 28 each of which which receives a coiled compression spring 29, the latter pressing against an internal front face of this hole 28.

Another difference is indicated in FIG. 5. The central guide groove 15 is not milled in a housing part, but is split, one half of the groove 15 being installed on one front end of the bush 26, while the other half is on an adjacent housing part 30. This could considerably facilitate manufacture. It is moreover clear that if need be the housing may comprise essentially one piece, so that the bush 26 is connected to the internal housing part 30.

Figure 7:
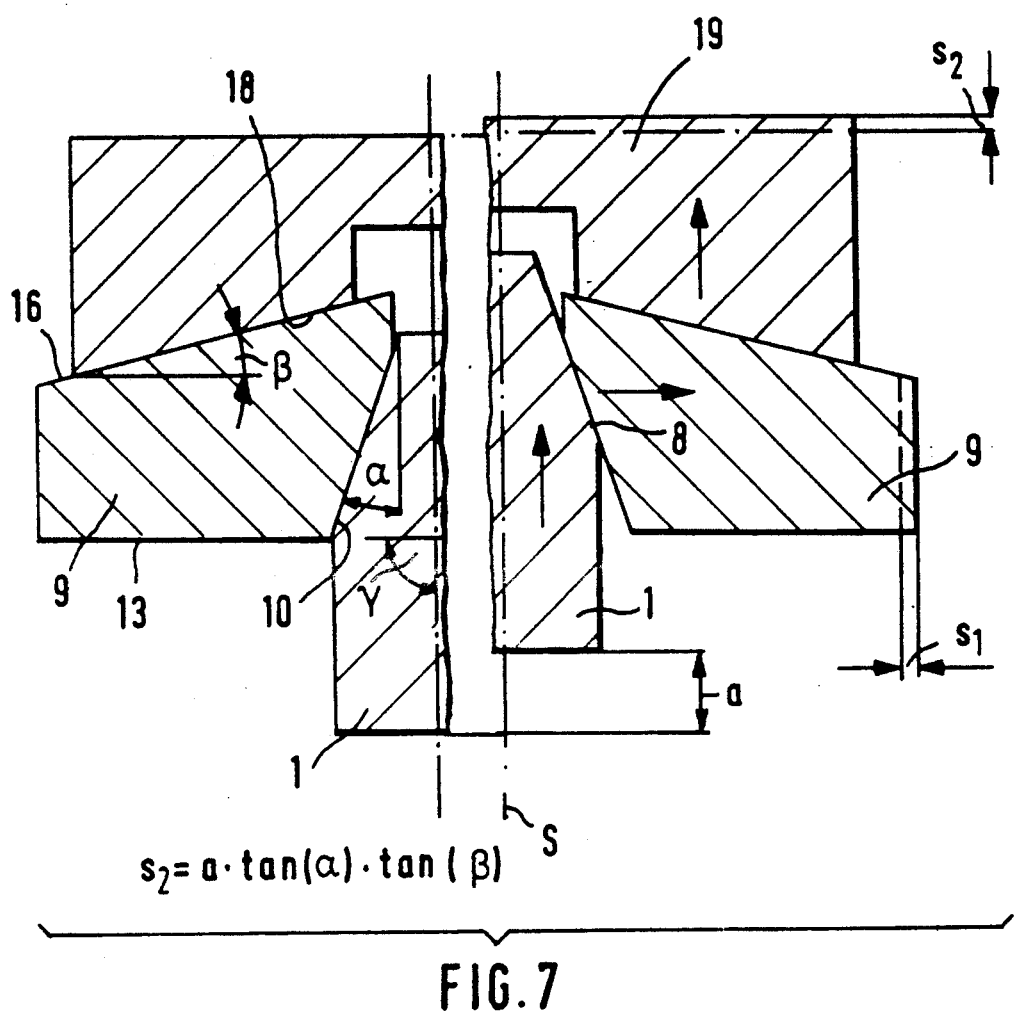
FIG. 7 is a schematic cross-sectional view showing relative travel of parts and surface angles.

FIG. 7 shows the relative travel and angle as a simple diagram. The drawing located on the left of the plane of symmetry S indicates the normal position, while the right-hand drawing shows the active condition of the parts 1, 9 and 19. The adjacent rolling faces are parallel to each other, so the face pairs 16, 18; 18 and 10 are shown as simple separating lines. The abutment 9 is of course supported underneath (this not shown). The wedge faces 8 and 10 include an angle $\alpha$ with a parallel plane to the plane of symmetry S, the wedge faces 16, 18 an angle $\beta$ with a plane perpendicular to the plane of symmetry S, and similarly the guide face 13 an angle $\gamma$ with a plane that is perpendicular to the plane of symmetry S, which will normally be 90°, but can be different, especially in the case of an encapsulated design per FIG. 4.

Thus if the angle $\gamma$ is taken to be 90°, then there will be the following conditions between the travel a of the primary member 1, the travel s1 of the abutment 9 and the travel s2 of the secondary member 19:

$$s1 = a \cdot \tan(\alpha) \quad [1]$$

whereas the travel of the secondary member 19 is $$s2 = s1 \cdot \tan(\beta) \quad [2]$$

from which after substituting the formula [1] we obtain:

$$s2 = a \cdot \tan(\alpha) \cdot \tan(\beta) \quad [3]$$

It can therefore be seen that the travel of the secondary member 19 is a function of just two variables, that is the angles $\alpha$ and $\beta$ (and possibly also $\gamma$), so that there is much scope in the matter of design.

In a practical example, the angle $\alpha$ may be 15° to 40°, preferably 25°. The angle $\beta$ can then be chosen to be smaller than $\alpha$ and may be 7° to 30°, preferably however 15°. In some cases it may however be desirable to make both angles $\alpha$ and $\beta$ identical. The power amplification is then (according to the lever principle) inversely proportional to the ratio of the travels a:s2.

The scope of the invention allows numerous different versions; thus all versions incorporate a retaining face 21' (similar to the retaining face 21), adjacent the guide face 13 of the abutment, which also serves to stop the roll bodies 5 from jumping out. However such a safeguard may be dispensed with in encapsulated versions, FIG. 4.

The design of the wedge faces (13, 14) may comprise not only an inclination to the plane of symmetry (S) which deviates from 90°, but it may also be curved uniformly or non-uniformly; also all wedge or rolling faces may have a radius which will achieve such a servo effect that, for example, an initially steep angle that then flattens off will achieve an initially greater travel with reduced power amplification, but toward the end a much shorter travel accompanied by a very great power amplification.

Finally, the design of the faces (16,18) as wedge faces is advantageous, because the faces (13, 14; 8, 10) only permit a deflection that is perpendicular to the plane of symmetry (S). Only the wedge faces (16,18) allow a deflection toward the initiated movement.

We claim:

1. A mechanical servomotor comprising a housing enclosing
   a) a primary input member,
   b) a moveable abutment member,
   c) a secondary output member, and
   d) a plurality of roll bodies, wherein said primary input member has wedge faces defined thereon and is moveably positioned between a symmetrical pair of mirror-image roll bodies arranged one on either side of said primary member so as to engage said wedge faces; each of said pair of roll bodies also engaging a respective abutment face along a plane of symmetry on said movable abutment member and at least one further pair of roll bodies being provided adjacent said abutment member; said abutment member being moveably mounted in the housing so as to allow a pure rolling movement of said roll bodies between said wedge faces and said abutment faces; and faces on said secondary member and/or corresponding faces on said abutment member are provided as further wedge faces engaged by said further roll bodies.

2. A servomotor as claimed in claim 1 wherein said abutment member is moveable perpendicularly to said plane of symmetry.

3. A servomotor as claimed in claim 1 wherein said further roll bodies rest or roll on opposing faces of said abutment member lying transversely to said plane of symmetry for the purpose of support and power transmission.

4. A servomotor as claimed in claim 3 wherein said abutment member is provided with guide faces on two opposite sides for guiding movement thereof, at least one of said further roll bodies being associated therewith such that on one side said wedge faces facing said secondary member constitute guide faces and at least one of said guide faces are associated with pairs of roll bodies on both sides of the plane of symmetry spaced from one another by an intermediate roll body.

5. A servomotor as claimed in claim 1 wherein at least one of said faces is inclined to the plane of symmetry at an angle differing from 90°.

6. A servomotor as claimed in claim 1 wherein at last one of a cooperating pair of faces on said primary member and abutment and a cooperating pair of said further wedge faces on opposite sides of respective roll bodies are parallel.

7. A servomotor as claimed in claim 1 wherein a retainer ring is provided at the end of at least one of said faces so as to limit the rolling movement of, and define the starting position of the roll bodies.

8. A servomotor as claimed in claim 7 wherein the retainer ring is provided on an end of the primary member facing the secondary member.

9. A servomotor as claimed in claim 1 wherein a return mechanism is provided which comprises a spring located between said secondary member and a fixed part of said housing.

* * * * *